US008239851B2

(12) United States Patent
Laicher et al.

(10) Patent No.: US 8,239,851 B2
(45) Date of Patent: Aug. 7, 2012

(54) BUSINESS SCOPE DEPENDENT ADD-ON CONTENT PROVISIONING

(75) Inventors: Karolin Laicher, Rauenberg (DE); Aaron Zhong, Shanghai (CN); Erich Zhang, Shanghai (CN); Frank Markert, Großostheim (DE); Haichao Wei, Shanghai (CN); Hongbo Ma, Chengdu (CN); Oliver Betz, Karlsdorf-Neuthard (DE); Xiaolong Chen, Shanghai (CN); Paul Xi, Shanghai (CN); Ye Jin, Nuerenberg (DE)

(73) Assignee: SAP AG, Walldorf (DE)

( * ) Notice: Subject to any disclaimer, the term of this patent is extended or adjusted under 35 U.S.C. 154(b) by 828 days.

(21) Appl. No.: 12/344,889

(22) Filed: Dec. 29, 2008

(65) Prior Publication Data

US 2010/0169873 A1 Jul. 1, 2010

(51) Int. Cl.
*G06F 9/445* (2006.01)
(52) U.S. Cl. ........................................ 717/168; 717/174
(58) Field of Classification Search .................. 717/168, 717/174
See application file for complete search history.

(56) References Cited

U.S. PATENT DOCUMENTS

| 7,058,797 B2 * | 6/2006 | Miyamoto et al. ........ 713/1 |
| 7,203,937 B1 * | 4/2007 | Kyle et al. ............... 717/168 |
| 7,366,824 B2 | 4/2008 | Chiang |
| 7,478,385 B2 | 1/2009 | Sierer et al. |
| 7,865,888 B1 * | 1/2011 | Qureshi et al. ........... 717/168 |
| 7,926,051 B2 * | 4/2011 | Barta et al. .............. 717/174 |
| 2005/0289533 A1 | 12/2005 | Wang et al. |
| 2006/0184926 A1 | 8/2006 | Or et al. |
| 2006/0206890 A1 | 9/2006 | Shenfield et al. |
| 2007/0089108 A1 | 4/2007 | Chen et al. |
| 2007/0157192 A1 | 7/2007 | Hoefler et al. |
| 2008/0126110 A1 | 5/2008 | Haeberle et al. |
| 2010/0162221 A1 | 6/2010 | Laicher et al. |

OTHER PUBLICATIONS

"Non-Final Office Action" mailed Dec. 1, 2011, for U.S. Appl. No. 12/339,437, entitled "Shipment Infrastructure for Add-On Content", filed Dec. 19, 2008, 22pgs.

* cited by examiner

*Primary Examiner* — Don Wong
*Assistant Examiner* — Deric Ortiz
(74) *Attorney, Agent, or Firm* — Buckley, Maschoff & Talwalkar LLC

(57) ABSTRACT

A system and method to install a software enhancement supplement of a main software product, the method including receiving an installation recommendation for the supplement having content including a business configuration (BC) object on a customer/service provider side of a business process platform from a product provider; displaying an indication of the receipt of the installation recommendation; processing the installation of the supplement into the business process platform of the customer; and providing a notification of the supplement's status upon completion of the supplement installation.

6 Claims, 6 Drawing Sheets

BUSINESS SCOPE DEPENDENT ADD-ON CONTENT PROVISIONING

FIELD

Some embodiments herein relate to the shipment of computer software content. In particular, some embodiments concern an infrastructure to support provisioning and shipment of supplemental computer software content, including the installation and maintenance of the supplemental computer software content based on business configuration considerations.

BACKGROUND

Business oriented computing systems, applications, and platforms may be developed and deployed to business entities to address both specific and general needs, capabilities, and management functionalities of the business entities. In general, a computer software product may be shipped and deployed by a software product provider to a software customer (e.g., a business or enterprise), wherein the software product includes a number of functionalities that can be used by the customer in the operation of their business to, for example, improve resource management, production, invoicing, customer support, and other functions relevant to their business.

While a computer software product may initially meet the requirements and needs of a software product customer or user, the customer's requirements and needs may change some time after the initial deployment of the business computer software product. The customer's requirements regarding the software product may change due to a change in the customer's needs, as driven by a change in the customer's business functions and operations, by a change in the customer's desire to further integrate the computer product into the operation of its business, and other factors. In some instances, the customer may desire additional features that are not present in the initial computer software product shipped or delivered to them.

In some instances, a software product provider may provide additional features to a computer software product in the form of a release of a new product of an existing product. A typically common aspect of a new product release of an existing product is that the new product release is typically provided as a standard solution to all customers. That is, the new product includes a common set of functionalities that is made available to all customers at the same time. Additionally, such new products typically include numerous changes that are developed by and at the discretion of the software provider.

In some instances, a new software product release may not adequately address the desired requirements of a particular customer. Also, it is typically not practical for a software product provider to provide a complete product or product version upgrade at the request of an individual customer or small select group of customers since, for example, the enhancement of a computer software product is time and resource intensive and may include the development, testing, installation, and maintenance of the new product or product version. Additionally, the desire to have a particular product feature may be unique to a only one or a few customers. In some instances, the customer requirements may not coincide with the software provider's product or product version release schedule. Also, the provisioning and management of different product or product version releases based on individual customer requests may not be supported, practical, and/or efficient for the software product provider.

Accordingly, a method and system that supports the shipment and provisioning of supplemental software enhancements including business configuration constraints and considerations are provided in some embodiments herein.

DETAILED DESCRIPTION

In some embodiments, functional enhancements to a main computer software product may be desired and requested by a software customer or user. As used herein, the terms supplement and "add-on" may be used to refer to a functional enhancement that supplements a main computer software product or provides (i.e., adds) additional functional capability to the main computer software product. In general, the functional enhancements provided by a supplement are relatively small compared to the corresponding main computer software product to which the supplement is associated. In some embodiments, mechanisms herein support providing supplements or add-ons without the necessity to alter the main computer software product to which the supplement relates.

Figure 1:
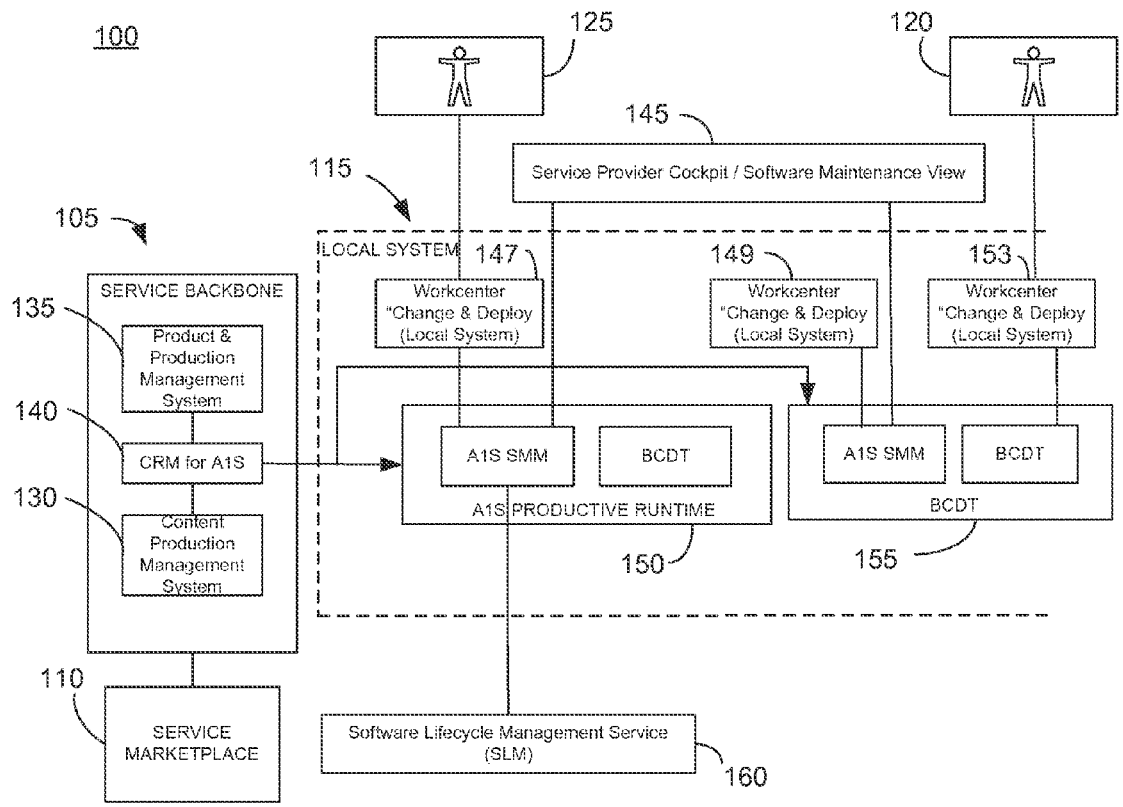
FIG. 1 is an exemplary block diagram illustrating a system, in accordance with various aspects of the present disclosure.

FIG. 1 is a block diagram of a system 100, according to some embodiments herein. It is noted that system 100 may include additional, fewer, and alternative components rather than being strictly limited to the configuration depicted in FIG. 1. Generally, system 100 provides an infrastructure for supporting the creation, assembly, and provisioning of supplements or "add-ons" that are created and provided by a software product provider. System 100 includes a service backbone 105 and a service marketplace 110 at a software product provider (e.g., developer) on a product provider side of the system that is interfaced with a local system 115 of a business process platform at a local system level on a customer/service provider side of the system. Local system 115 may be maintained or administered by a customer 120 or service provider 125 at the customer local system level 115.

On the product provider side, system 100 includes service backbone 105 that has a Content Production Management System (CPMS) 130 and a Product and Production Management System (PPMS) 135. CPMS 130 is the main control unit for the creation, assembly, and provisioning of supplements or add-ons. CPMS 130 controls to which customer(s) a supplement is to be shipped. CPMS 130 is aware of the content of a supplement. In some embodiments herein, specifics regarding how, when, and to which customer(s) the supplement is shipped may be based on the particular component or type of content comprising the supplement, and other characteristics of the supplement. Based on its knowledge of the content of the supplement, CPMS 130 controls to which customer(s) the particular supplement is shipped. Awareness of the supplement content type may be represented by meta data associated with the supplement. CPMS 130 may pass along at least portions of the meta data associated with the content type and other characteristics of the supplement to local system 115.

Returning to FIG. 1, customer service side 101 is interfaced with product provider side 102 and provides a mechanism for the delivery of content from the service center of the product provider. As illustrated, RT system 150 and BCDT system 155 are provided on the customer side 102, where the BCDT provides a central maintenance instance for hosting the customer's workspaces. A Software Maintenance Manager (SMM) of the business process platform (e.g., ByDesign by SAP AG, but not limited thereto) provides a mechanism and infrastructure for the management of software changes in local system 115. The SMM handles the technical provisioning of a supplement published and provided by the service center of the product provider.

In some embodiments, in addition to triggering the creation of a supplement installation recommendation the CPMS may provide required meta data for UI (user interface) related information to the customer/service provider side of system 100. In some embodiments, CPMS 130 may provide information that allows the SMM on the customer side 102 to be aware of process handling and dependencies.

PPMS 135 is a central database and knowledge base for information regarding the software products and components provided by the product provider. Supplements are modeled in PPMS 135. In some embodiments, the supplement may contain three (3) types of content. Accordingly, the supplement content is mapped to PPMS 135 entries associated with the supplement to capture relevant aspects of the supplement content.

Figure 2:
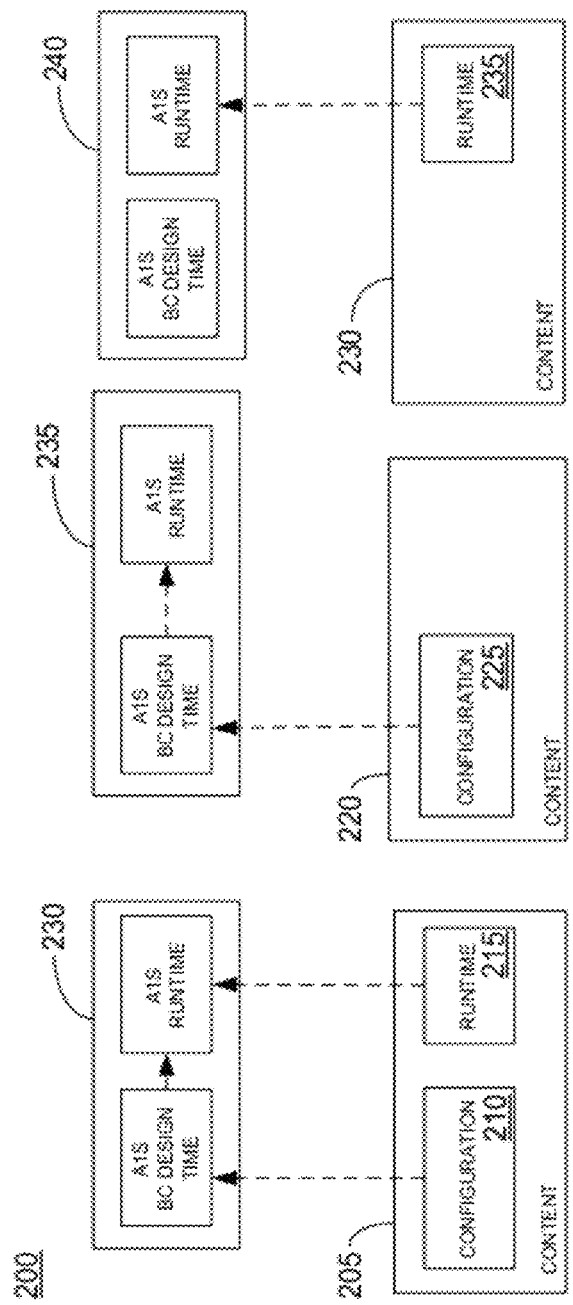
FIG. 2 is an exemplary depiction of supplement content, in accordance with some embodiments herein.

FIG. 2 is an illustrative depiction of three types of content, 205, 220, and 230, that may comprise a supplement, in accordance with some embodiments herein. Content 205 includes both Business Configuration (Configuration or BC) objects 210 and runtime (RT) objects 215. Content 220 includes only Configuration or BC objects 210 (e.g., BC options, or BC sets), whereas content 230 includes only RT objects 235 (e.g., a query and form template). Thus, content of a supplement may include RT relevant objects, configuration relevant objects, or both. In some aspects, the RT relevant objects and the BC objects comprising the content of a supplement can be separate and distinct from each other. BC objects are installed in the Business Configuration Design Time (BCDT) system 155 on the customer/service provider side of system 100, whereas RT objects related to runtime aspects of the supplement are installed in the RT system 150.

FIG. 2 further illustrates Configuration objects of supplement content are installed in the BCDT 155 and RT objects of the content are installed in the RT system 150 on the customer/service provider side of system 100. In this manner, how, when, and where a supplement and its corresponding content is installed may be dependent on the nature of the content of the supplement.

Figure 3:
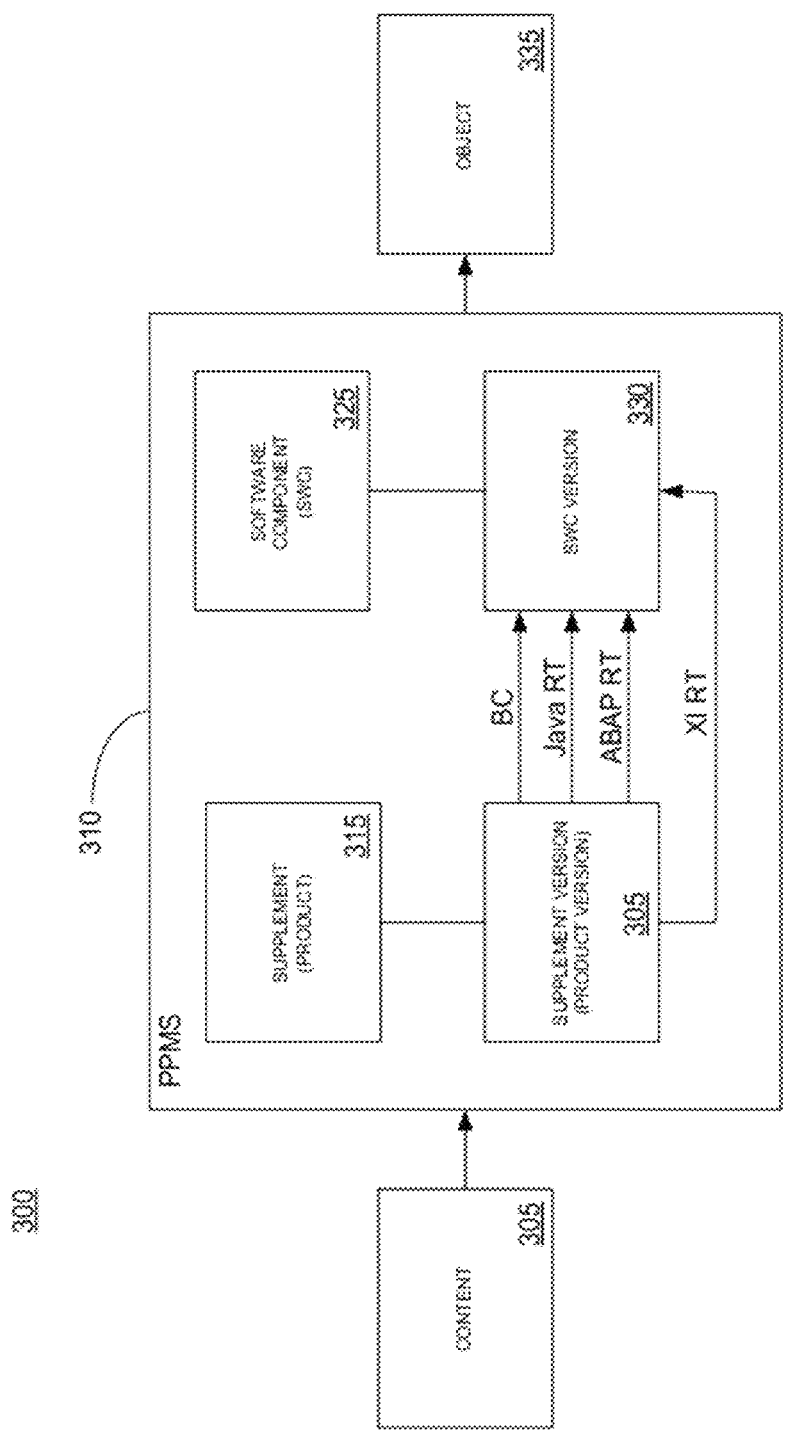
FIG. 3 is an illustrative diagram depicting modeling of supplemental content, in accordance with some aspects of the present disclosure.

As illustrated in FIG. 3, some embodiments of a PPMS 310 may include entries for a Supplement (Product) 315, a Supplement Version (Product Version) 320, a Software Component (SWC) 325, and a Software Component Version (SWC Version) 330 that map to content 305 of a supplement. In some embodiments, the content of each supplement is mapped to a Product in PPMS 310. PPMS may be the same as or similar to PPMS 135 shown in FIG. 1. The content is mapped to the PPMS 310 entries Product, Product Version, Software Component and Software Component Version.

It is noted that a SWC Version 330 may include a combination of BC or RT components (e.g., JAVA Runtime, ABAP Runtime, and XI (i.e., SAP Exchange Infrastructure) Runtime). As further used herein, a supplement refers to a particular Product/Product Version (PV) in PPMS. Each PV is a representation of a group of SWC versions and describes a supplement at a specific point in time of a life-cycle of the supplement and may include multiple software features.

In compliance with the modeling of a business process platform product (e.g., By Design by SAP AG, although may be extended to other platforms), each runtime stack may correspond to one supplement Software Feature. Each supplement software feature may contain one or more SWC Versions, including a corresponding Support Package Level. Each SWC Version/Software Feature is exclusively assigned to one supplement PV. Thus, in some embodiments there is no reuse of SWC versions/Software Features in different supplements.

In some embodiments, an initial shipment of a supplement corresponds to an initial product version (e.g., PV "Supplement A 1.0") and a feature enhancement of a supplement corresponds to new PV (e.g., PV "Supplement A 2.0"). With some embodiments, shipment of initial supplement may also require the creation of Support Package Stack (SPS) based on a particular product version. As used herein, a SPS describes a product version at a specific point in time with respect to its SWC Version support package patch level. For example, in By Design each SWC Version may have only one exact Support Package Level per Support Package Stack.

In some embodiments, a supplement is based on a certain software PV/PV plus a Support Package Stack as a start release. Starting with this SPS, the service center (CPMS 130 and PPMS 135) of the product provider may guarantee compatibility to the main product to which the supplement is associated. In this manner, a known configuration and supportable level of the product is provided from which supplements may be developed and shipped. Accordingly, accurate tracking of supplement and supplement versions may be tracked and maintained.

In addition to the creation of the supplement, individual content objects comprising a SWC Version and PV are registered in PPMS 135, as shown in FIG. 3. The assembled objects 315 of the supplement are uploaded to a service marketplace for publication to the customer.

In some embodiments herein, a maintenance package for a shipped functionality is referred to as a "hot fix". Such hot fixes correspond to a new SPS based on a particular and specific product version (e.g. PV "Supplement A 1.0 SPS n"). In some embodiments, CPMS 130 and PPMS 135 (i.e., the service center) support hot fixes. Since there is direct correspondence between a PV and a hot fix as identified by a SPS, there is no requirement for regular shipment of maintenance packages to all customers. Instead, a hot fix need only be shipped via SPSs with a corresponding PV to a customer having the installed PV.

In accordance with embodiments herein, supplement content may include four main instances of content, including three types of RT objects and one type of Configuration objects. Instances of supported RT types, in ByDesgn by SAP for example, may include ABAP, Java, and XI types of RT content, as illustrated in FIG. 3. For example, ABAP RT content may relate to ABAP add-on packages and ABAP support packages. Java RT type content may relate to, for example, a Java support package and XI RT type content may be related to an XI support package. In some embodiments, supported content includes:

- Reports comprising ABAP+Java (optional) (BC+RT);
- Forms/Excel Templates composed of ABAP (BC+RT Content)+XI (Optional);
- Field Extensions (without value help) composed of ABAP+Java+XI
- Field Extensions (with value help) composed of ABAP (RT)+ABAP (BC)+Java+XI; and
- UI Changes composed of Java.

In some embodiments, a customer (e.g., a project team) may order or otherwise request a supplement or functionality that is developed and published as a supplement. In some embodiments, the customer (e.g., 120) may make determinations based on business relevant questions regarding supplements ordered and used by the customer's business. In such instances, the customer may work in the BCDT user interface to control and communicate with the local system 115.

As related to the supplements herein, a user interface of the SMM may be accessed and used to control the installation and maintenance of supplements published to the customer by the service center of the product provider. In some embodiments, an IT Administrator may be responsible for the software maintenance of local system 115, wherein the illustrated SMM provides the mechanism for such tasks. In some instances, the SMM may be controlled directly or locally by a user (e.g., user 125 via a workcenter 147) or controlled remotely via a central console by, for example, a Service Provider Cockpit 145. Work centers 147 and 149 relate to a change and deploy work space for controlling and interfacing with SMM of RT system 150 and BCDT system 155 at the local system 115. Work center 153 provides a work space for controlling and interfacing with the BCDT of BCDT 155.

System 100 provides the infrastructure to facilitate and otherwise support the installation and maintenance of supplements published by the product provider. Regarding an installation of a supplement, a customer order for a requested enhancement may be received by the product provider. Content developed in response to the customer request for a feature or functionality is developed by CPMS 130, including internal testing and approval, and is registered with PPMS 135. The supplement created in the product provider's service backbone 105 will contain corresponding installation and maintenance packages. These installation and maintenance packages are then published and shipped to the customer system 115 and installed into the customer local system 115.

In some embodiments, supplements provide by the product provider may be developed and provided on demand in response to a customer's specific request. In some other instances, supplements may be developed and provided by the product developer and offered to suitable customers from a catalog or repository of supplements. The supplement provided in the catalog of content may be browsed or otherwise viewed and ordered from the catalog by the customer.

An Installation Recommendation is created on backbone 105 and pushed to customer system 115. Based on the content of the supplement (e.g., RT only, Configuration only, or RT and Configuration), the Installation Recommendation is sent to either RT system 150, BCDT system 155, or both. In an instance the Installation Recommendation regarding a supplement is sent to both RT system 150 and BCDT 155, a determination is made regarding any dependency handling based on the inclusion of both RT and Configuration objects in the content of the supplement. As used herein, dependency handling refers to a RT object of the supplement being dependent on the Configuration aspects of the supplement, as specified by the Installation Recommendation. In some embodiments, an Installation Recommendation for a supplement containing both RT and Configuration content is not displayed in RT system 150 until after a prerequisite activity for the supplement is created by the BCDT system 155. Once the prerequisite activity has been created in the BCDT, the installation of the supplement proceeds with the Installation Recommendation being made available in RT system 150. Upon being made available (i.e., visible for selection), the installation of the supplement including both RT and Configuration type content is completed.

With respect to supporting a maintenance function related to the shipment of supplements, a hot fix that addresses corrections of an associated supplement are shipped via the SPS. Based on the content type of a supplement, the SPS contains either RT objects, Configuration (BCDT) objects, or both. In some embodiments, the hot fix content comprising a SPS content also determines whether BC re-scoping is required or not.

In some embodiments, an installation process of supplements herein includes shipment of an initial SWCV to the customer/service provider. It is noted that an initial version of the supplement is shipped with a corresponding SPS. Based on the supplement content type (e.g., a report, a form, etc.) the SPS associated with the supplement contains either RT objects, BC objects, or both RT and BC objects corresponding to similar objects in the supplement.

Some embodiments, the supplement content determines whether an installation recommendation from CPMS 130 is sent to RT system 150 only, BCDT system 155 only, or to both systems 150 and 155. In the instance the installation recommendation is sent to both RT 150 and BCDT 155 systems, required dependency handling of dependencies between the RT objects and the BC objects of the supplement content is determined.

In some embodiments, an installation recommendation is not displayed (i.e., presented and made available for installation by the customer) before BCDT system 155 notifies the SMM in the RT system 150 that the required inter-dependent actions have been completed in BCDT system 155.

Figure 4:
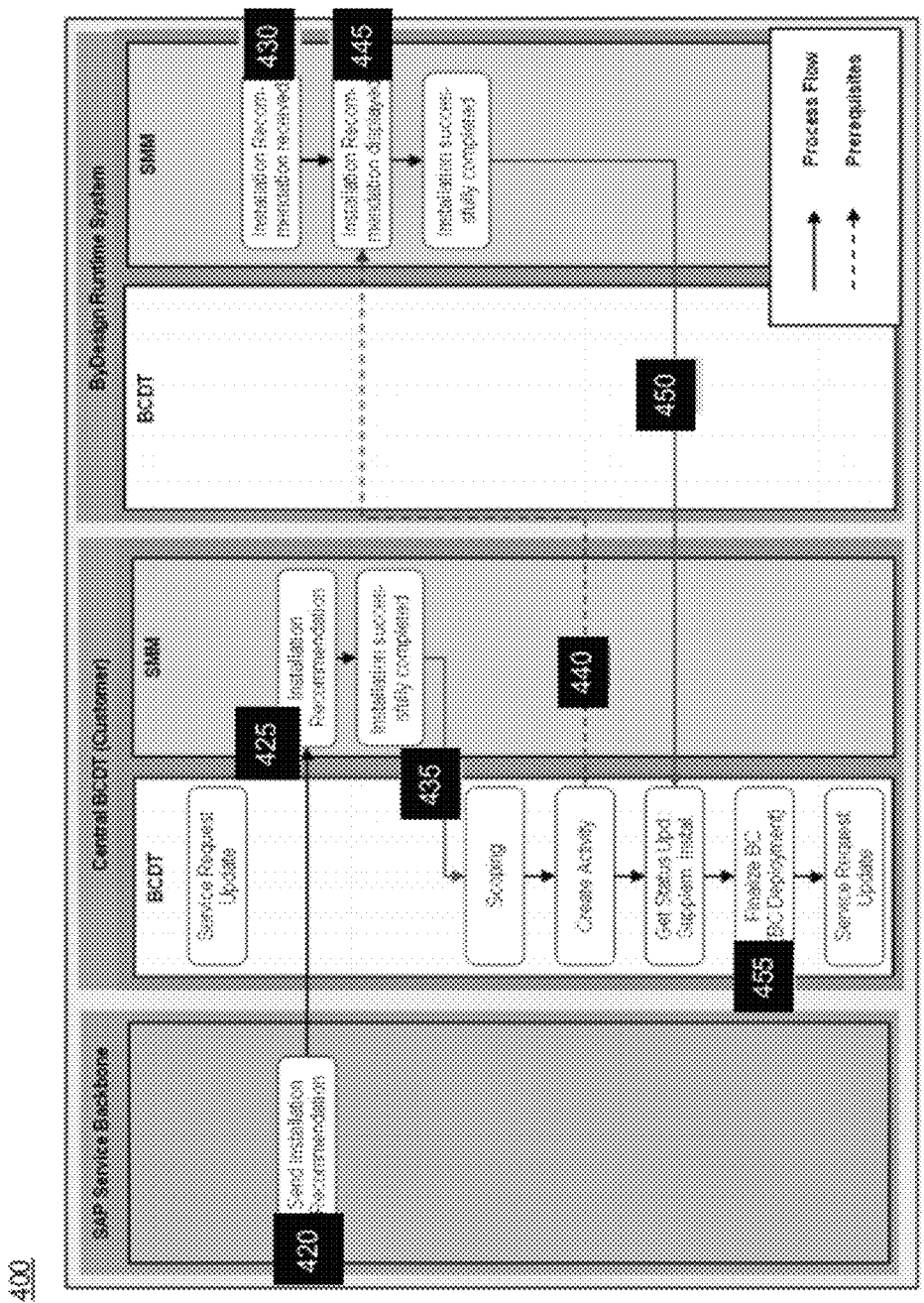
FIG. 4 is an illustrative depiction of a process to install a supplement having content types of both RT objects and BC objects, in accordance with some embodiments herein.

FIG. 4 provides an illustrative depiction of a process to install a supplement having content types of both RT objects and BC objects. Driven by business configuration decisions of a customer on the customer/service provider side of system 100 and in response to a request for a feature(s) including BC, CPMS 130 triggers (420) the creation of an installation recommendation for RT system 150 and associated BCDT system 155. The installation recommendation is received on the customer/service provider side and is displayed in SMM Workcenter "Change & Deploy" in BCDT 149,153. The installation recommendation is received by the SMM of the RT system (430) but set to invisible. The installation is not visible for selection and installation by the customer at this time since the RT objects of the supplement are dependent on the BC objects of the supplement. In particular, the installation aspect of the supplement on RT system 155 is not made visible or otherwise advanced until the prerequisite installation and BCDT task (create activity) are fulfilled.

In some embodiments, an IT Administrator processes supplement installation in BCDT. Once the supplement installation process is successfully finished, the SMM notifies the BCDT system of supplement's status (435). The supplement's status may be indicated as being successfully installed on the system. The notification may include an indication of supplement related information such as, for example, recommendation type, product version PPMS Number, SPS PPMS Number, Status, System Number.

Follow-Up activities such as, for example, scoping, create activity, etc., on BCDT system 155 may then be processed. The BCDT will, in some embodiments, provide an update (440) to the SMM of the RT system 415 once required BCDT activity has been created for the supplement to be installed. The SMM sets (445) the installation recommendation to visible in RT system 150 after it is informed that the prerequisite activity is accomplished on the BCDT system 155. The supplement may then be installed on RT system 150.

Once supplement installation process is successfully installed on the RT system, the SMM will notify BCDT 155 about the supplement's status. The notification may include data indicative of, for example, the supplements recommendation type, PV PPMS Number, SPS PPMS Number, Status, system number, etc. Finalization activities (455) on BCDT system 155 may be processed by the BCDT to complete the supplement installation based on the supplement having both RT objects and BC objects.

Figure 5:
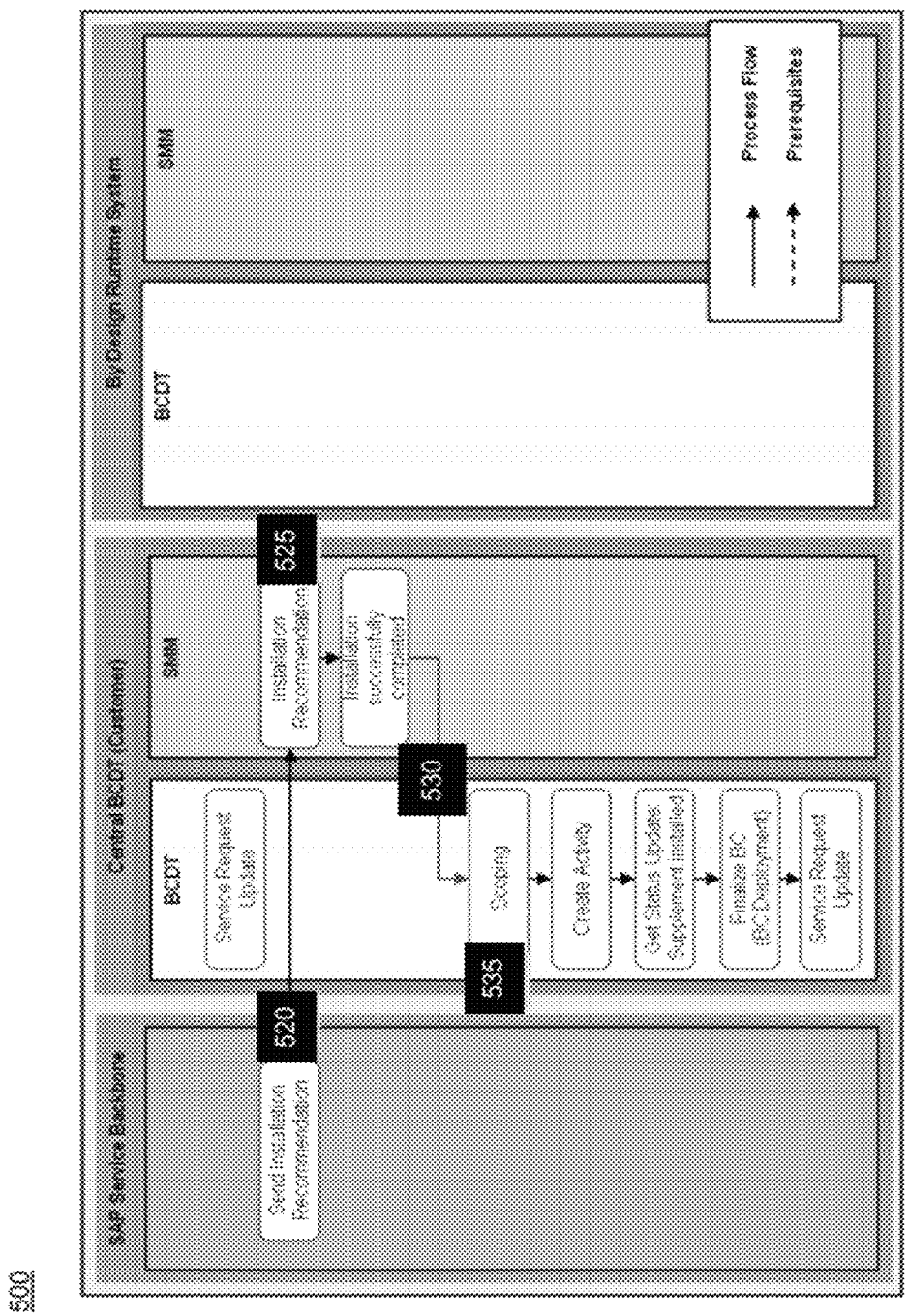
FIG. 5 is an illustrative depiction of a process to install a supplement having BC object only content type, in accordance with some embodiments herein.

FIG. 5 provides an illustrative depiction of a process to install a supplement having only BC object content. In some instances, business configuration decisions of a customer on the customer/service provider side of system 100 may result in the request for BC relevant features, the creation of a supplement to implement the requested changes, and the shipment of the supplement including BC content. CPMS 130 triggers (520) the creation of an installation recommendation for associated BCDT system 155. The installation recommendation is received on the customer/service provider side and is displayed in SMM Workcenter "Change & Deploy" in BCDT 149,153.

In some embodiments, an IT Administrator processes supplement installation in the BCDT system. Once the supplement installation process is successfully finished, the SMM notifies the BCDT system of supplement's status (530). The supplement's status may be indicated as being successfully installed on the system. The notification may include an indication of supplement related information such as, for example, recommendation type, product version PPMS Number, SPS PPMS Number, Status, System Number. Further follow-up activities such as, for example, scoping, create activity, etc., on BCDT system 155 may then be processed (535) to complete the supplement installation based on the supplement having both RT objects and BC objects.

Figure 6:
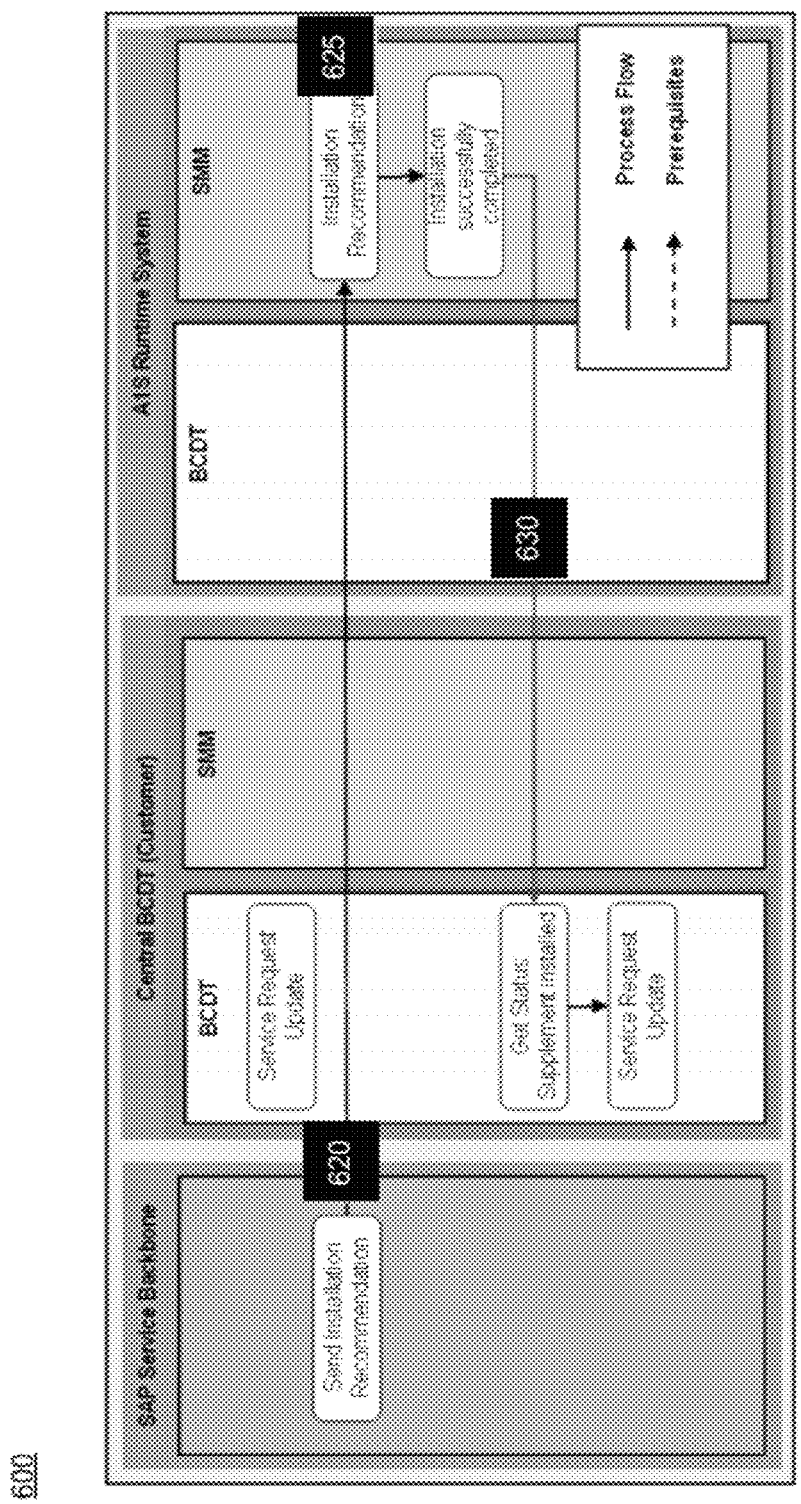
FIG. 6 is an illustrative depiction of a process to install a supplement having RT object only content type, in accordance with some embodiments herein.

FIG. 6 provides an illustrative depiction of a process to install a supplement having on RT object(s) content. As shown, CPMS 130 triggers (420) the creation of an installation recommendation for RT system 150 only. The installation recommendation is received on the customer/service provider side and is displayed in SMM Workcenter "Change & Deploy" in BCDT 147. The installation recommendation is received by the SMM of the RT system (625). In some embodiments, an IT Administrator processes supplement installation in RT system 150. Once the supplement installation process is successfully finished, the SMM notifies the BCDT system of supplement's status (630). The supplement's status may be indicated as being successfully installed on the system. The notification may include an indication of supplement related information such as, for example, recommendation type, product version PPMS Number, SPS PPMS Number, Status, System Number.

Follow-Up activities (not shown) such as, for example, scoping, create activity, etc., on BCDT system 155 may then be processed to complete the supplement installation based on the supplement having both RT objects and BC objects.

For some embodiments, maintenance packages only contain hot fix content. That is, the hot fix does not include any additional functional enhances but instead include content directed to correcting or fixing the shipped supplement. Accordingly, a hot fix (i.e., a supplement update recommendation) may be displayed to a customer on the customer side 102 and applied to the system by IT Administrator without additional notification from BCDT since, in some embodiments, no new enhancements are included in the hot fix.

In some embodiments, a Software Lifecycle Management (SLM) control is provided at 160 of FIG. 1. SLM 160 may provide a mechanism for planning and executing of software changes in system 100. In some embodiments, SLM 160 maintains a life cycle schedule for a main product and a separate life cycle schedule for a supplement associated with Product/Product Version. A separation of the life cycle of the supplement from its associated Product allows for the independent installation and maintenance of the supplement. It is noted that the life cycle of a supplement not exceed (i.e, outlive) the lifecycle of the Product associated with the supplement.

The embodiments herein may be implemented in computer hardware, including firmware. The embodiments herein may, in some instances, be implemented in computer software, while in some instances embodiments may be implemented in a combination of hardware and software. Some embodiments may be implemented as a computer program product, i.e., a computer program tangibly embodied in a hardware medium, e.g., in a machine-readable storage device having program code or instructions stored thereof, for execution by, or to control the operation of, a data processor (e.g., a programmable processor, a computer, or network of computers). In some embodiments, a computer program in accordance with the present disclosure may be implemented independent of a particular programming language and/or processing system and/or computer operation or application platform.

Suitable processors for the execution of a program of instructions include, by way of example, both general and special purpose microprocessors, and the sole processor or one of multiple processors of any kind of computer. Storage devices and mediums suitable for tangibly embodying computer program instructions and data may include, for example, all forms of non-volatile memory, magnetic disks, magneto-optical disks, CD-ROM and DVD-ROM disks. In related embodiments, computer program may operate independent of any particular form of programming language, computing system, industry, application, communication protocol, and operating system.

A number of embodiments of the invention have been described herein. However, it will be understood that various modifications may be made without departing from the spirit and scope of the invention. Accordingly, other implementations are within the scope of the following claims.

What is claimed is:

1. A method to install a software enhancement supplement of a main software product, the method comprising:

receiving, on a customer/service provider side of a business process platform from a product provider, an installation recommendation for a software enhancement supplement of a main software product, the software enhancement supplement having content including a business configuration (BC) object content type and the receiving being based on the type of content of the software enhancement supplement;

displaying an indication of a receipt of the installation recommendation;

processing an installation of the BC object of the software enhancement supplement into a Business Configuration Design Time (BCDT) system of the business process platform; and providing a notification of the software enhancement supplement's status upon completion of the software enhancement supplement installation.

2. The method of claim 1, further comprising:

receiving a request from a customer to install the software enhancement supplement; and processing the installation of the software enhancement supplement into the business process platform in response to a receipt of the request to install the software enhancement supplement from the customer.

3. The method of claim 1, wherein the software enhancement supplement includes a runtime (RT) object content type in combination with the BC object content type.

4. The method of claim 3, wherein an installation of the RT object of the software enhancement supplement into a runtime (RT) system of the business process platform is dependent on an installation of at least one activity of the BC object of the software enhancement supplement into the BCDT system of the business process platform.

5. The method of claim 4, wherein the installation of the RT object of the software enhancement supplement is performed after the installation of the at least one activity of the BC object of the software enhancement supplement.

6. The method of claim 1, herein the notification comprising at least one of: a recommendation type, a product version of a main software product associated with the software enhancement supplement, a support package stack comprising the software enhancement supplement, and a status update.

* * * * *